United States Patent
Kamiya et al.

(10) Patent No.: US 8,096,382 B2
(45) Date of Patent: Jan. 17, 2012

(54) CONSTRUCTION MACHINE

(75) Inventors: Shohei Kamiya, Tsuchiura (JP);
Kazunori Nakamura, Tsuchiura (JP);
Yasushi Arai, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 247 days.

(21) Appl. No.: 12/598,995

(22) PCT Filed: May 28, 2008

(86) PCT No.: PCT/JP2008/059779
§ 371 (c)(1),
(2), (4) Date: Nov. 5, 2009

(87) PCT Pub. No.: WO2008/146831
PCT Pub. Date: Dec. 4, 2008

(65) Prior Publication Data
US 2010/0139255 A1    Jun. 10, 2010

(30) Foreign Application Priority Data
May 31, 2007    (JP) ................................ 2007-145364

(51) Int. Cl.
*B60T 7/309* (2006.01)
(52) U.S. Cl. .................. 180/277; 180/303; 180/309
(58) Field of Classification Search .................. 180/271, 180/277, 303, 309
See application file for complete search history.

(56) References Cited

U.S. PATENT DOCUMENTS

| | | | |
|---|---|---|---|
| 5,566,774 A * | 10/1996 | Yoshida | 180/65.245 |
| 6,582,340 B1 | 6/2003 | Arie et al. | |
| 7,685,815 B2 * | 3/2010 | Gudorf | 60/295 |
| 7,694,764 B2 * | 4/2010 | Sasaki | 180/65.285 |
| 7,987,935 B2 * | 8/2011 | Ichimoto | 180/65.28 |
| 2006/0184307 A1 | 8/2006 | Kosaka | |
| 2007/0190377 A1 * | 8/2007 | Elwart et al. | 429/22 |
| 2008/0156569 A1 * | 7/2008 | Clevenger et al. | 180/296 |
| 2010/0276223 A1 * | 11/2010 | Gonze | 180/309 |
| 2011/0192671 A1 * | 8/2011 | Mitsuda et al. | 180/309 |

FOREIGN PATENT DOCUMENTS

| | | |
|---|---|---|
| JP | 2001-152921 A | 6/2001 |
| JP | 2002-371831 A | 12/2002 |
| JP | 2006-226171 A | 8/2008 |

OTHER PUBLICATIONS

International Search Report dated Jun. 24, 2008 including English translation (Two (2) pages).

* cited by examiner

*Primary Examiner* — Toan To
(74) *Attorney, Agent, or Firm* — Crowell & Moring LLP

(57) ABSTRACT

[PROBLEM] To provide a construction machine capable of performing necessary operation or operations without a difficulty even when a remaining amount of a reducing agent becomes small.
[SOLUTION] In a hydraulic excavator having an engine, a hydraulic cylinder (18), plural actuators including a hydraulic motor (29), and an exhaust gas treatment system for subjecting, to purification treatment, nitrogen oxides in exhaust gas from the engine, the hydraulic excavator is provided with an actuator operation control means for performing, when the remaining amount of the reducing agent in a reducing agent storage tank (30) is detected by a remaining reducing-agent amount detector (33) to have become equal to or smaller than a predetermined remaining amount, limiting control to limit an operation of the hydraulic cylinder (18) such that a front working implement driven by the hydraulic cylinder (18) becomes difficult to exhibit its function, and at a same time, holding control for holding the hydraulic motor (20) operable such that a function of a travel base (1) or swing upperstructure (3) driven by the hydraulic motor (20) can be exhibited.

7 Claims, 3 Drawing Sheets

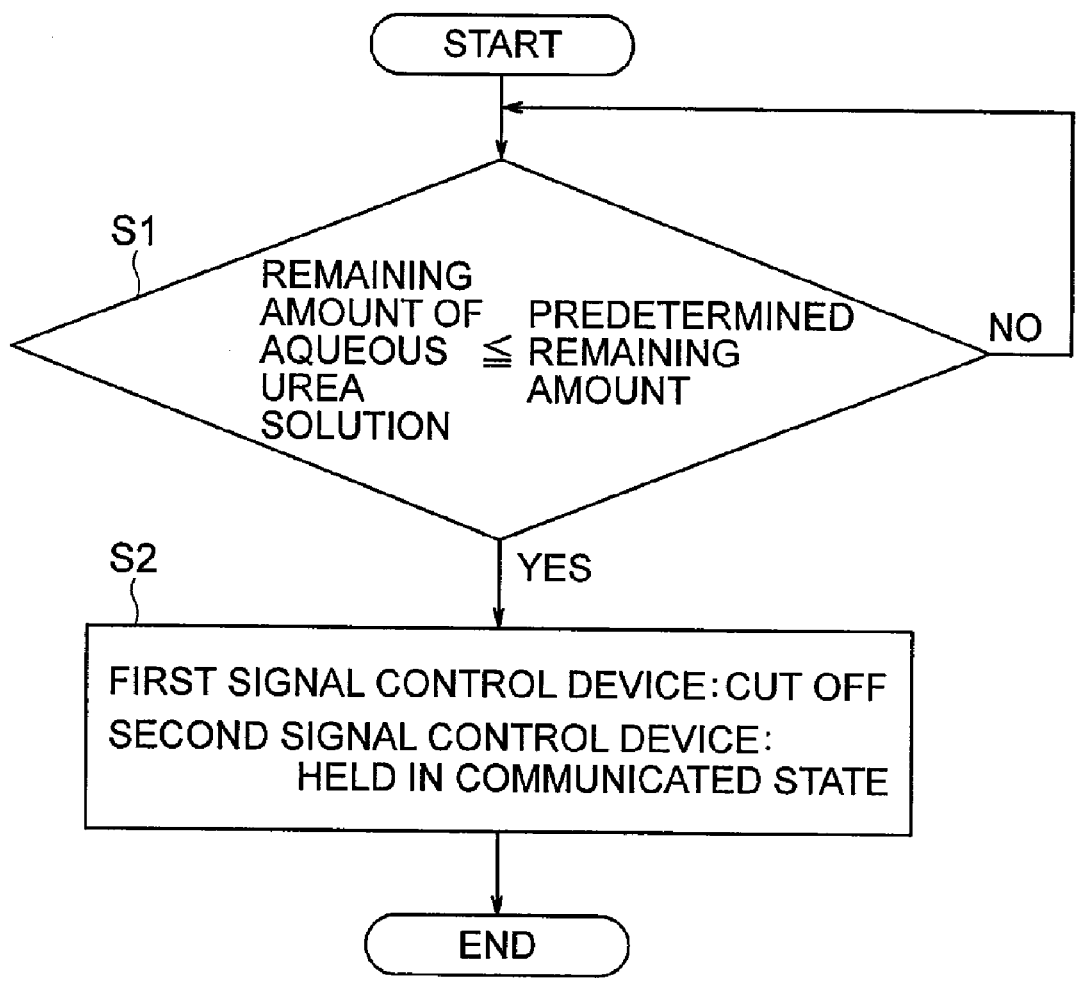

US 8,096,382 B2

CONSTRUCTION MACHINE

TECHNICAL FIELD

This invention relates to a construction machine such as a hydraulic excavator, which is provided with an exhaust gas treatment system having a reduction catalyst for decreasing NOx in exhaust gas from an engine.

BACKGROUND ART

As a result of the application of higher-order emission control standards to diesel engines, it has become necessary nowadays to install an exhaust gas treatment system in addition to a muffler on a vehicle body on which an engine is mounted. Examples of the above-mentioned exhaust gas treatment system include particulate matter trap filters, NOx treatment systems of the urea-selective reduction type, NOx catalysts, and the like. It is an NOx treatment system of the urea-selective reduction type that uses a liquid reducing agent for such reduction of NOx and the liquid reducing agent is an aqueous urea solution.

As a conventional technology of this sort, there is the technology described in Patent Document 1. In an exhaust gas treatment system according to this conventional technology, an oxidation catalyst, an NOx storage catalyst and a selective reducing-agent catalyst are arranged in an exhaust passage of an internal combustion engine. Further, the exhaust gas treatment system is provided with a reducing agent injection device for injecting a reducing agent, i.e., an aqueous urea solution, which is fed from an aqueous urea solution tank as a reducing agent storage tank, into the exhaust passage, that is, an injection nozzle, and also, with a remaining reducing-agent amount detection device for detecting a remaining amount of the aqueous urea solution in the aqueous urea solution tank, that is, an aqueous urea solution sensor.

This conventional technology is designed such that, when the remaining amount of the aqueous urea solution in the aqueous urea solution tank as detected by the aqueous urea solution sensor has become small, control is performed to reduce an output torque or the like and hence to lower the concentration of NOx in exhaust gas, thereby allowing the vehicle to reach a service station, where the aqueous urea solution can be replenished, while limiting the degree of decrease of the aqueous urea solution in the aqueous urea solution tank.

Patent Document 1: JP-A-2006-226171

DISCLOSURE OF THE INVENTION

Problem to be Solved by the Invention

In a construction machine to which the present invention can be applied, such as a hydraulic excavator, the performance of control to reduce an output torque as in the above-described conventional technology when the remaining amount of an aqueous urea solution, that is, a reducing agent has become equal to or smaller than a predetermined remaining amount results in a situation that the operating speed of a working actuator for driving a load such as a front working implement becomes slower and the operating speeds of a travel actuator and swing actuator also become slower. Namely, the operating speeds of all the actuators become slower, so that motions of a load, such as the front working implement, and other loads, such as a travel base and swing upperstructure, become slow. There is, accordingly, such a concern that it may take time in traveling to a replenishment place for the reducing agent or a trouble may arise in connection with such an operation as needed to quickly perform a travel or swing for the avoidance of a danger in the event of an emergency.

The present invention has been completed in view of the current situation of the above-mentioned conventional technology, and its object is to provide a construction machine capable of performing a necessary operation without a difficulty even when the remaining amount of a reducing agent has become small.

Means for Solving the Problems

To achieve this object, the present invention is characterized in that in a construction machine having an engine, a power source drivable by the engine, and plural actuators drivable by power fed from the power source, said actuators including a predetermined actuator, and also an exhaust gas treatment system arranged in an exhaust passage from the engine, and comprising a reduction catalyst for reducing and purifying nitrogen oxides in exhaust gas with the reducing agent, a reducing agent storage tank, and a remaining reducing-agent amount detector for detecting a remaining amount of the reducing agent stored in the reducing agent storage tank, the construction machine is provided with an actuator operation control means for performing, when the remaining amount of the reducing agent in the reducing agent storage tank is detected by the remaining reducing-agent amount detector to have become equal to or smaller than a predetermined remaining amount, limiting control to limit an operation of the predetermined actuator such that a load driven by the predetermined actuator becomes difficult to exhibit a function thereof, and at a same time, holding control for holding at least one other actuator, which is different from the predetermined actuator, operable such that a function of another load driven by the at least one other actuator can be exhibited.

To enable an operation for replenishing the reducing agent or a necessary operation such as a quick operation for the avoidance of a danger in the event of an emergency even when the remaining amount of the reducing agent in the reducing agent storage tank has become small, the present invention constituted as descried above performs advance selection of an actuator, which can be considered to be kept inoperative under such a situation, as the predetermined actuator, and also advance selection of at least one other actuator, an operation of which is considered to be needed under such a situation, as the remaining actuators. When the remaining amount of the reducing agent in the reducing agent storage tank is detected by the remaining reducing-agent amount detector to have become equal to or smaller than the predetermined remaining amount in the above-described situation, the limiting control is performed by the actuator operation control means to limit the operation of the predetermined actuator so that the exhibition of the function of the load driven by the predetermined actuator is inhibited, and on the other hand, the holding control is performed by the actuator operation control means to hold the at least one other actuator operable such that the function of the another load driven by the at least one other actuator can be exhibited.

As described above, when the remaining amount of the reducing agent in the reducing agent storage tank has become equal to or smaller than the predetermined remaining amount, the operation of the predetermined actuator is limited under the limiting control by the actuator operation control means to reduce the load on the engine, thereby making it possible to lower the concentration of NOx in exhaust gas. As a consequence, the degree of decrease of the reducing agent in the reducing agent storage tank can be limited.

The operation of the predetermined actuator is limited as described above, and as a result, the motion of the load driven by the predetermined actuator is limited. This can make the operator of the construction machine become aware that the remaining amount of the reducing agent in the reducing agent storage tank is equal to or smaller than the predetermined remaining amount and the reducing agent needs to be replenished.

In particular, even when the remaining amount of the reducing agent in the reducing agent storage tank has become equal to or smaller than the predetermined remaining amount, it is still possible, as described above, to drive the another load by an operation of the at least one other actuator and hence to perform a necessary operation without a difficulty.

The present invention is also characterized in that in the above-described invention, the limiting control performed by the actuator operation control means is control that inhibits the operation of the predetermined actuator.

According to the present invention constituted as described above, the drive of the load associated with the predetermined actuator is stopped under the limiting control by the actuator operation control means when the remaining amount of the reducing agent in the reducing agent storage tank has become equal to or smaller than the predetermined remaining amount. As a consequence, the load on the engine can be reduced more certainly. Further, it is possible to make the operator become aware more clearly that the remaining amount of the reducing agent in the reducing agent storage tank is small and the reducing agent needs to be replenished.

The present invention is further characterized in that in the above-described invention, the holding control performed by the actuator operation control means is control that enables an operation of the at least one other actuator at a normal speed free from any speed limitation to the at least one other actuator.

According to the present invention constituted as described above, the at least one other actuator can still be operated at the normal speed to perform the necessary operation more certainly under the holding control by the actuator operation limiting means even when the remaining amount of the reducing agent in the reducing agent storage tank has become equal to or smaller than the predetermined remaining amount.

The present invention is still further characterized in that in the above-described invention, the at least one other actuator is the travel actuator or swing actuator and the predetermined actuator is an actuator different from the travel actuator or swing actuator.

According to the present invention constituted as described above, it is still possible to perform a travel operation by the operation of the travel actuator and/or a swing operation by the swing actuator even when the remaining amount of the reducing agent in the reducing agent storage tank has become equal to or smaller than the predetermined remaining amount. Therefore, it is possible to promptly perform a replenishing operation of the reducing agent by the travel operation or an avoidance maneuver in the event of an emergency by the travel operation and/or swing operation.

The present invention is even still further characterized in that in the above-described invention, the construction machine is a hydraulic excavator and the predetermined actuator is an actuator for driving a front working implement.

According to the present invention constituted as described above, the motion of the front working implement is limited under the limiting control by the actuator operation limiting means when the remaining amount of the reducing agent in the reducing agent storage tank has become equal to or smaller than the predetermined remaining amount. By the limited motion of the front working implement, it is, therefore, possible to make the operator of the hydraulic excavator become aware that the remaining amount of the reducing agent in the reducing agent storage tank is small and the reducing agent needs to be replenished.

Advantageous Effects of the Invention

To enable a necessary operation even when the reducing agent has become small, the present invention beforehand selects an actuator, which can be considered to be kept inoperative under such a situation, as a predetermined actuator, and also beforehand selects at least one other actuator, an operation of which is considered be needed under such a situation, as an actuator different from the predetermined actuator. When the remaining amount of the reducing agent has become equal to or smaller than the predetermined remaining amount, the motion of the load driven by the predetermined actuator is limited under limiting control of the predetermined actuator by the actuator operation control means. By this limited motion of the load, it is possible to make the operator of the construction machine become aware that the reducing agent needs to be replenished. Further, when the remaining amount of the reducing agent has become equal to or smaller than the predetermined remaining amount as described above, the limiting control of the predetermined actuator can reduce the load on the engine, thereby making it possible to lower the concentration of NOx in exhaust gas and hence to limit the degree of decrease of the reducing agent in the reducing agent storage tank. In particular, even in a situation that the remaining amount of the reducing agent has become equal to or smaller than the predetermined remaining amount, the operating speed of the at least one other actuator can be held so that the another load associated with the at least one other actuator can be quickly moved. It is, therefore, possible to perform without a difficulty a necessary operation such as an operation for the replenishment of the reducing agent or an operation for the avoidance of a danger in the event of an emergency. The construction machine can, therefore, be provided with higher reliability than conventional construction machines.

BEST MODE FOR CARRYING OUT THE INVENTION

The present invention will hereinafter be described based on a best mode for carrying out the construction machine according to the present invention.

FIG. 1 is a side view showing a hydraulic excavator according to one embodiment of the construction machine of the present invention, FIG. 2 is a diagram depicting a drive circuit and exhaust gas treatment system arranged in the embodiment, and FIG. 3 is a flow chart illustrating essential parts of processing executed at a controller included in the drive circuit arranged in the embodiment.

As shown in FIG. 1, this embodiment is provided with a travel base 1 having tracks drivable by a travel actuator, for example, a travel motor 2, and a swing upperstructure 3 disposed on the travel base 1 and drivable by an unillustrated swing actuator, for example, a swing motor. An operator's cab 4 is arranged on the swing upperstructure 3 at a forward position thereof. At a position rear of the operator's cab 4, an engine compartment 5 is arranged with an engine 6 accommodated therein, and on a rear end portion, a counterweight 7 for ensuring weight balancing is arranged.

This embodiment is provided, on a forward side of the swing upperstructure 5, with a boom 8 mounted pivotally in an up-and-down direction on the swing upperstructure 5, an arm 9 secured pivotally in an up-and-down direction on a free end of the boom 8, and a bucket 10 attached pivotally in an up-and-down direction on a free end of the arm 9. This embodiment is also provided with a boom cylinder 11 for driving the boom 8, an arm cylinder 12 for driving the arm 9, and a bucket cylinder 13 for driving the bucket 10. A front working implement, which can perform digging work and the like, is constructed by these boom 8, arm 9, bucket 10, boom cylinder 11, arm cylinder 12 and bucket cylinder 13.

As depicted in FIG. 2, this embodiment is also provided with main hydraulic pumps 14,15 and pilot hydraulic pumps 16,17, which are drivable by the engine 6 and make up power sources. In FIG. 2, a hydraulic cylinder 18 which constitutes a hydraulic actuator exemplifies the above-mentioned boom cylinder 11, arm cylinder 12 or bucket cylinder 13. On the other hand, a hydraulic motor 20 exemplifies the above-mentioned travel motor 2 or swing motor.

The above-mentioned front working implement makes up a load drivable by the hydraulic cylinder 18, while the above-mentioned travel base 1 or swing upperstructure 3 makes up another load drivable by the hydraulic motor 20. It is to be noted that, to enable an necessary operation of the above-mentioned hydraulic cylinder 18 even when a reducing agent in a reducing agent storage tank 30 has become equal to or smaller than a predetermined remaining amount, the hydraulic cylinder 18 has been selected beforehand as a predetermined actuator which can be considered to be kept inoperative under such a situation while the hydraulic motor 20 has been selected beforehand as another actuator an operation of which is considered be needed under such a situation.

This embodiment is also provided with a first directional control valve 19 arranged between the main hydraulic pump 14 and the hydraulic cylinder 18 to control a flow of pressure oil to be fed from the main hydraulic pump 14 to the hydraulic cylinder 18, a second directional control valve 21 arranged between the main hydraulic pump 15 and the hydraulic motor 20 to control a flow of pressure oil to be fed from the main hydraulic pump 15 to the hydraulic motor 20, a first control device 22 for generating a secondary pressure, which is adapted to switch the first directional control valve 19, as a signal pressure by using as a primary pressure a pilot pressure delivered from the pilot hydraulic pump 16, and a second control device 23 for generating a secondary pressure, which is adapted to switch the second directional control valve 21, as a signal pressure by using as a primary pressure a pilot pressure delivered from the pilot hydraulic pump 17. The above-described respective elements make up the drive circuit arranged in this embodiment.

This embodiment is also provided with the exhaust gas treatment system for decreasing nitrogen oxides, i.e., NOx in exhaust gas from the engine 6. As depicted in FIG. 2, this exhaust gas treatment system includes a reduction catalyst 29 arranged in an exhaust passage 28 of the engine 6 to reduce and purify NOx in exhaust gas with a reducing agent such as an aqueous urea solution, the reducing agent storage tank 30 for storing the reducing agent such as the aqueous urea solution, and a remaining reducing-agent amount detector 33 for detecting a remaining amount of the reducing agent stored in the reducing agent storage tank 30. The exhaust gas treatment system also includes a reducing agent feeder 31 for drawing in the reducing agent from the reducing agent remaining amount storage tank 30, in which the reducing agent is stored, and feeding the same, and a reducing agent injector 32 for injecting the reducing agent, which has been fed by the reducing agent feeder 31, into the exhaust passage 28 at a location on an upstream side of the reduction catalyst 29.

This embodiment is also provided with a first signal path 24 for guiding a signal pressure which is to be fed from the first control device 22 to a control port of the first directional control valve 19, a first signal control device 25 composed, for example, of an on/off valve capable of cutting off or communicating the first signal path 24, a second signal path 26 for guiding a signal pressure which is to be fed from the second control device 23 to a control port of the second directional control valve 21, and a second signal control device 27 composed, for example, of an on/off valve capable of cutting off or communicating the second signal path 26. This embodiment is also provided with a controller 35 having a determination means for comparing the remaining amount of the reducing agent as detected by the above-mentioned remaining reducing-agent amount detector 33 with the predetermined remaining amount set in advance and making a determination and adapted to output, based on a result of the determination, control signals to control the first signal control device 25 and second signal control device 27, and a monitor 34 connected to the controller 35 and capable of displaying that the remaining amount of the reducing agent is small. This monitor 34 is arranged, for example, in the operator's cab 4.

The above-mentioned controller 35 and the above-mentioned first signal control device 25 and second signal control device 27 make up an actuator operation control means that, when the remaining amount of the reducing agent in the reducing agent storage tank 30 is detected by the remaining reducing-agent amount detector 33 to have become equal to or smaller than the predetermined remaining amount, performs limiting control to limit an operation of the hydraulic cylinder 18 as the predetermined actuator such that the load driven by the hydraulic cylinder 18, specifically the front working implement becomes difficult to exhibit its function, and at a same time, holding control to enable an operation of the hydraulic motor 20 as the at least one other actuator different from the predetermined actuator such that the function of another load driven by the hydraulic motor 20, specifically the travel base 1 or swing upperstructure 3 is exhibited.

The limiting control performed by the actuator operation control means can be, for example, control that inhibits an operation of the hydraulic cylinder 18, while the holding control performed by the actuator operation control means can be, for example, control that enables an operation of the hydraulic motor 20 at a normal speed free from any speed limitation to the hydraulic motor 20.

In this embodiment constituted as described above, while the reducing agent in the reducing agent storage tank 30 is detected by the remaining reducing-agent amount detector 33 to be greater than the predetermined remaining amount and to be in such a remaining amount as requiring no replenishment, specifically when a determination (remaining urea solution amount≦predetermined remaining amount?) by the determination means built in the controller 35 as shown in step S1 of FIG. 3 is "NO", the first signal control device 25 and second signal control device 27 hold the first signal path 24 and second signal path 26 in communicated states, respectively, by control signals outputted from the controller 35 on the basis of the determination.

When, for example, the first control device 22 is operated in the state that the first signal path 24 and second signal path 26 are held communicated as described above, a signal pressure corresponding to the stroke of the operation of the first control device 22 is applied to the control port of the first directional control valve 19 via the first signal path 24 and first signal control device 25, and the first directional control valve 19 is switched. As a result, the pressure oil delivered from the main hydraulic pump 14 is fed to the hydraulic cylinder 18 via the first directional control valve 19, and hence, the hydraulic cylinder 18 is operated to drive the above-mentioned front working implement. It is, therefore, possible to perform digging work or the like via driving of the boom 8, arm 9 and bucket 10.

When, for example, the second control device 23 is operated in the state that the first signal path 24 and second signal path 26 are held communicated, a signal pressure corresponding to the stroke of the operation of the second control device 23 is applied to the control port of the second directional control valve 21 via the second signal path 26 and second signal control device 27, and the second directional control valve 21 is switched. As a result, the pressure oil delivered from the main hydraulic pump 15 is fed to the hydraulic motor 20 via the second directional control valve 21, and hence, the hydraulic motor 20 is operated to drive the travel base 1 or swing upperstructure. It is, therefore, possible to perform a combined operation of front work and travel, a single travel operation, a single swing operation, or the like.

During the above-mentioned drive of the front working implement or the above-mentioned travel operation or swing operation, the reducing agent which has been drawn in by the reducing agent feeder 31 from the reducing agent storage tank 30 is fed to the reducing agent injector 32, and is then injected from the reducing agent injector 32 into the exhaust passage 28 of the engine 6. Exhaust gas, in which the reducing agent has been incorporated as described above, comes into contact with the reduction catalyst 29 arranged in the exhaust passage 28, whereby NOx in the exhaust gas are degreased as is known well.

On the other hand, when the remaining amount of the reducing agent in the reducing-agent storage tank 30 is detected by the remaining reducing agent amount detector 33 to be smaller than the predetermined remaining amount and to be a remaining amount that needs to be replenished, specifically when the determination (remaining urea solution amount≦predetermined remaining amount?) by the determination means built in the controller 35 as shown in step S2 of FIG. 3 is "YES", a display signal is outputted from the controller 35 to the monitor 34, and a warning is displayed on the monitor 34 to the effect that the remaining amount of the reducing agent is small and a replenishment is needed. In addition, the actuator operation control means as an element characteristic to this embodiment is actuated to perform limiting control that the first signal control device 25 cuts off the first signal path 24 by a control signal from the controller 35, specifically limiting control that inhibits an operation of the hydraulic cylinder 18 which drives the front working implement, and also holding control that the second signal control device 27 still holds the second signal path 26 in the communicated state, specifically holding control that enables an operation of the hydraulic motor 20, which drives the travel base 1 or swing upperstructure 3, at the normal speed free from any speed limitation to the hydraulic motor 20. As a consequence, the front working implement is held in a drive stopped state that its function cannot be exhibited, and the travel base 1 and swing upperstructure 2 are held in states that their functions can be exhibited.

Described specifically, even when the first control device 22 is operated, a signal pressure generated at the first control device 22 is cut off at the first signal control device 25 and is not guided to the control port of the first directional control valve 19, so that the first directional control valve 19 is held in a neutral position. Therefore, the pressure oil from the main hydraulic pump 14 is not fed to the hydraulic cylinder 18, and the front working implement is held in the drive stopped state. When the second control device 23 is operated, a signal pressure corresponding to the stroke of the operation of the second control device 23 is applied to the control port of the second directional control valve 21 via the second signal path 26 and second signal control device 27, and the second directional control valve 21 is switched, as mentioned above. As a result, the pressure oil delivered from the main hydraulic pump 15 is fed to the hydraulic motor 20, and the hydraulic motor 20 is operated to enable driving of the travel base 1 or swing upperstructure 3.

In this embodiment constituted as described above, when the remaining amount of the reducing agent in the reducing agent storage tank 30 has become equal to or smaller than the predetermined remaining amount, an operation of the hydraulic cylinder 18 is inhibited under limiting control by the actuator operation control means including the determination means built in the controller 35, and the front working implement is held in the drive stopped state. Therefore, the load on the engine 6 is reduced, and the concentration of NOx in exhaust gas flowing through the exhaust passage 28 can be lowered. As a consequence, the degree of decrease of the reducing agent in the reducing agent storage tank 30 can be limited.

The display of the warning on the monitor 34 can make the operator of the hydraulic excavator become aware that the remaining amount of the reducing agent in the reducing agent storage tank 30 is equal to or smaller than the predetermined remaining amount and the reducing agent needs to be replenished. In addition, the operation of the hydraulic cylinder 18 is inhibited, and as a result, the motion of the front working implement driven by the hydraulic cylinder 18 is stopped. This stoppage can also make the operator of the hydraulic excavator become aware that the remaining amount of the reducing agent in the reducing agent storage tank 30 is equal to or smaller than the predetermined remaining amount and the reducing agent needs to be replenished.

In particular, even when the remaining amount of the reducing agent in the reducing agent storage tank 30 has become equal to or smaller than the predetermined remaining amount as descried above, the travel base 1 or swing upperstructure 3 can be quickly moved by an operation of the hydraulic motor 20 so that a necessary motion, specifically a travel operation or swing operation can still be performed. It is, therefore, possible to perform without a difficulty a travel operation at a normal speed for the replenishment of the reducing agent or a quick travel operation or swing operation for the avoidance of a danger in the event of an emergency. As a consequence, the construction machine can be provided with high reliability.

The above-described embodiment is designed to have a construction that the first signal control device 25 and second signal control device 27 are both composed of on/off valves. However, the embodiment may be designed to have a construction that the first signal control device 25 is composed of a pressure control valve and the second signal control device 27 is composed of an on/off valve, a construction that the first signal control device 25 is composed of an on/off valve and the second signal control device 27 is composed of a pressure control valve, or a construction that the first signal control device 25 and second signal control device 27 are both composed of pressure control valves.

A description will be made of the case that the embodiment is designed to have the construction that the first signal control device 25 is composed of the pressure control valve and the second signal control device 27 is composed of the on/off valve. When the remaining amount of the reducing agent in the reducing agent storage tank 30 has become equal to or smaller than the predetermined remaining amount, it becomes possible to output a control signal from the controller 35 to the first signal control device 25 such that the opening area of the first signal control device 25 is controlled to permit feeding to the control port of the first directional control valve 19 a signal pressure capable of switching the first directional control valve 19 such that the pressure oil can be fed from the hydraulic pump 14 to the hydraulic cylinder 18 at such a flow rate as allowing the front working implement to undergo such an extremely slow movement as failing to perform intended work. On the other hand, the second signal control device 25 holds the second signal path 26 in the communicated state even in such a situation. The hydraulic motor 20 can, therefore, be operated at a normal speed, so that the travel base 1 or swing upperstructure 3 can be driven to perform a necessary operation, such as a replenishing operation of the reducing agent or an operation for the avoidance of a danger in the event of an emergency, without a difficulty.

A description will next be made of the case that the embodiment is designed to have the construction that the first signal control device 25 is composed of the on/off valve and the second signal control device 27 is composed of the pressure control valve. When the remaining amount of the reducing agent in the reducing agent storage tank 30 has become equal to or smaller than the predetermined remaining amount, the front working implement is held in a drive stopped state, and at the same time, it becomes possible to output a control signal from the controller 35 to the second signal control device 27 such that the opening area of the second signal control device 27 is controlled to feed to the control port of the second directional control valve 21 a signal pressure capable of switching the second directional control valve 21 such that the pressure oil can be fed from the main hydraulic pump 15 to the main hydraulic motor 20, which drives the travel base 1 or swing upperstructure 2, at such a flow rate as enabling a travel operation or swing operation at a speed which is slower than the normal speed but is still sufficiently fast. The embodiment constituted as described above can also perform a necessary operation without a difficulty in a situation that the remaining amount of the reducing agent has become equal to or smaller than the predetermined remaining amount, although the operation is slower than that in the first embodiment.

A description will further be made of the case that the embodiment is designed to have the construction that the first signal control device 25 and second signal control device 27 are both composed of the pressure control valves. In a situation that the remaining amount of the reducing agent has become equal to or smaller than the predetermined remaining amount, it is possible, as is appreciated from the foregoing description, to perform such an extremely slow movement of the front working implement as failing to perform its intended work and a travel operation or swing operation at a speed which is slower than the normal speed but is still sufficiently fast. It is, therefore, possible to perform a necessary operation, such as a replenishing operation of the reducing agent or an operation for the avoidance of a danger in the event of an emergency, without a difficulty.

The above-described embodiment is designed to have the construction that the hydraulic cylinder 18 has been selected beforehand as a predetermined actuator to which the limiting control is applied and that the hydraulic motor 20 has been selected beforehand as another actuator to which the holding control is applied. The present invention is, however, not limited to such a construction. In view of necessary operations which are conceivable under the situation that the reducing agent in the reducing agent storage tank 30 has become small, these predetermined actuator and another actuator can be selected from plural actuators as needed.

The above-described embodiment is a hydraulic excavator, but the present invention is not limited to such a hydraulic excavator. The present invention can be applied to various construction machines which are each provided with an engine, an exhaust gas treatment system and plural actuators.

BRIEF DESCRIPTION OF THE DRAWINGS

FIG. 3 A flow chart illustrating essential parts of processing executed at a controller included in the drive circuit arranged in the embodiment.

LEGEND

Figure 1:
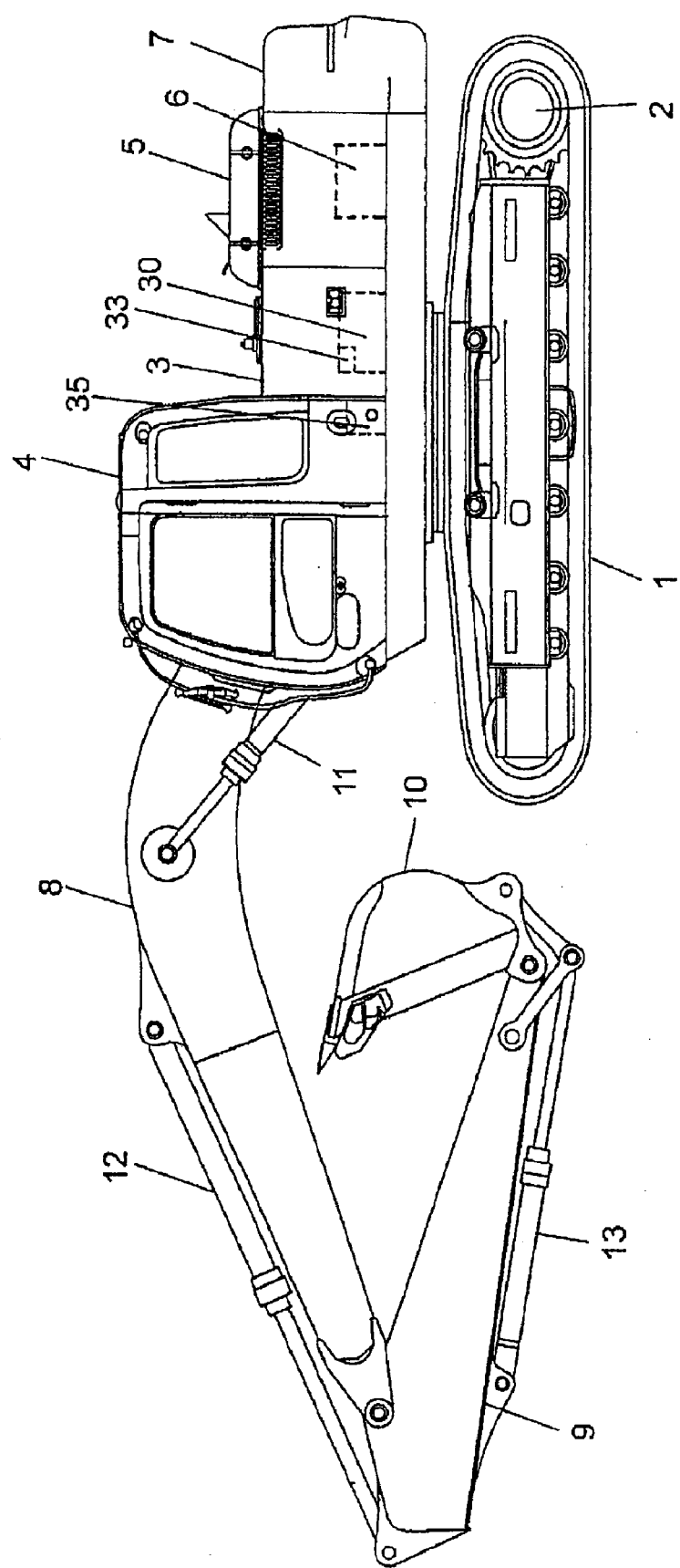
FIG. 1 A side view showing a hydraulic excavator as one embodiment of the construction machine according to the present invention.
Figure 2:
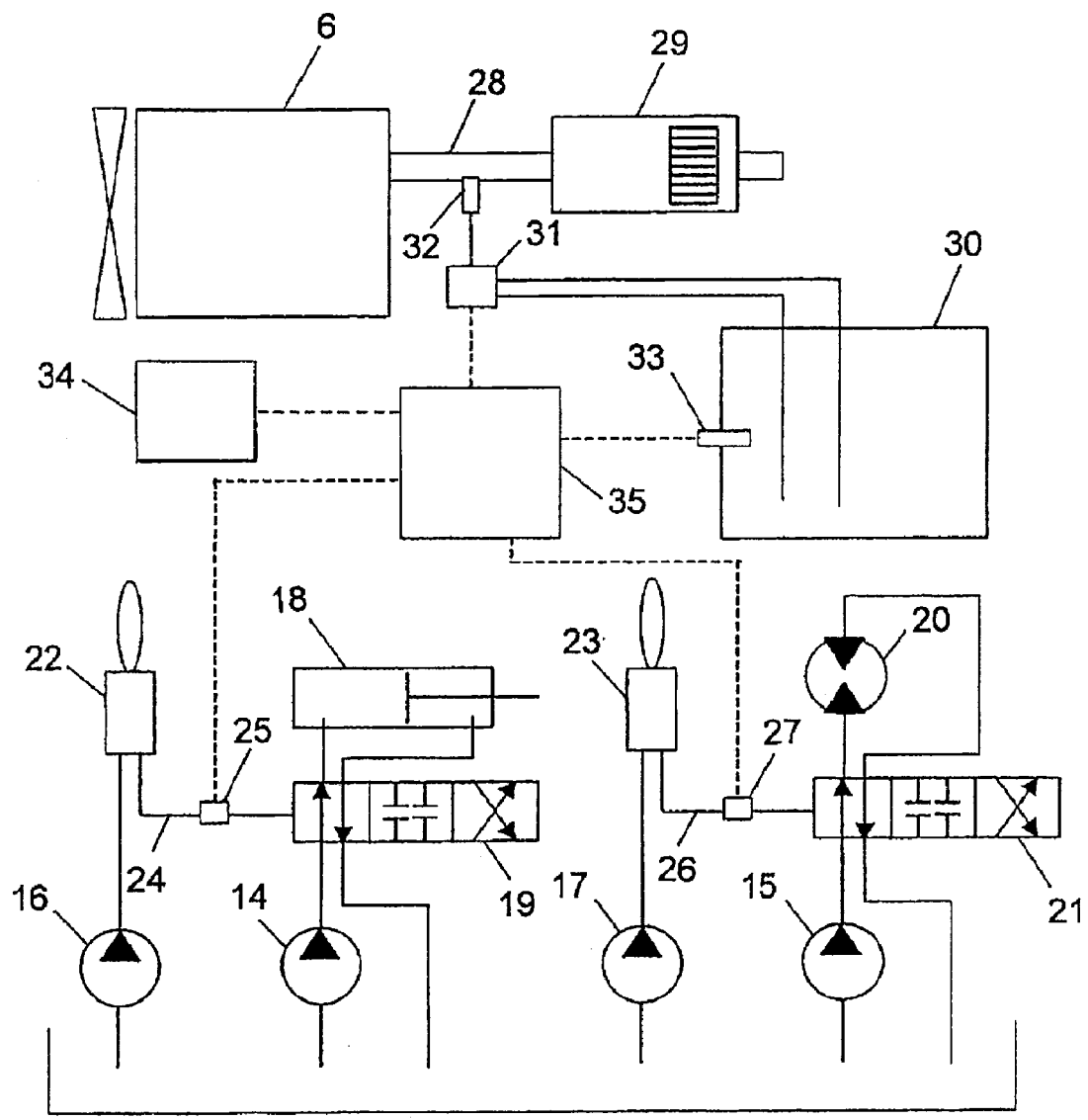
FIG. 2 A diagram depicting a drive circuit and exhaust gas treatment system arranged in the embodiment.

1 Travel base
2 Travel motor (travel actuator)
3 Swing upperstructure
6 Engine
8 Boom
9 Arm
10 Bucket
11 Boom cylinder
12 Arm cylinder
13 Bucket cylinder
14 Main hydraulic pump (power source)
15 Main hydraulic pump (power source)
16 Pilot hydraulic pump (power source)
17 Pilot hydraulic pump (power source)
18 Hydraulic cylinder (predetermined actuator)
19 First directional control valve
20 Hydraulic motor (at least one other actuator)
21 Second directional control valve
22 First control device
23 Second control device
24 First signal path
25 First signal control device (actuator operation control means)
26 Second signal path
27 Second signal control device (actuator operation control means)
28 Exhaust passage
29 Reduction catalyst
30 Reducing agent storage tank
33 Remaining reducing-agent amount detector
35 Controller (actuator operation control means)

The invention claimed is:
1. A construction machine having:
an engine, a power source drivable by the engine, and plural actuators drivable by power fed from the power source, said actuators including a predetermined actuator, and
an exhaust gas treatment system arranged in an exhaust passage from the engine, and comprising a reduction catalyst for reducing and purifying nitrogen oxides in exhaust gas with the reducing agent, a reducing agent storage tank, and a remaining reducing-agent amount detector for detecting a remaining amount of the reducing agent stored in the reducing agent storage tank, characterized in that:

the construction machine is provided with an actuator operation control means for performing, when the remaining amount of the reducing agent in the reducing agent storage tank is detected by the remaining reducing-agent amount detector to have become equal to or smaller than a predetermined remaining amount, limiting control to limit an operation of the predetermined actuator such that a load driven by the predetermined actuator becomes difficult to exhibit a function thereof, and at a same time, holding control for holding the at least one other actuator, which is different from the predetermined actuator, operable such that a function of another load driven by the at least one other actuator can be exhibited.

2. The invention as defined in claim 1, wherein the limiting control performed by the actuator operation control means is control that inhibits the operation of the predetermined actuator.

3. The invention as defined in claim 1, wherein the holding control performed by the actuator operation control means is control that enables an operation of the at least one other actuator at a normal speed free from any speed limitation to the at least one other actuator.

4. The invention as defined in claim 1, wherein:
the at least one other actuator is the travel actuator or swing actuator, and
the predetermined actuator is an actuator different from the travel actuator or swing actuator.

5. The invention as defined in claim 4, wherein:
the construction machine is a hydraulic excavator, and
the predetermined actuator is an actuator for driving a front working implement.

6. The invention as defined in claim 2, wherein:
the at least one other actuator is the travel actuator or swing actuator, and
the predetermined actuator is an actuator different from the travel actuator or swing actuator.

7. The invention as defined in claim 3, wherein:
the at least one other actuator is the travel actuator or swing actuator, and
the predetermined actuator is an actuator different from the travel actuator or swing actuator.

* * * * *